(No Model.)

T. J. HENABERY.
Drag Sawing Machine.

No. 240,515. Patented April 26, 1881.

Witnesses

Inventor
Thomas J. Henabery
By
Attorneys

UNITED STATES PATENT OFFICE.

THOMAS J. HENABERY, OF CHICAGO, ILLINOIS, ASSIGNOR OF ONE-THIRD TO NILES E. PETERSON, OF SAME PLACE.

DRAG-SAWING MACHINE.

SPECIFICATION forming part of Letters Patent No. 240,515, dated April 26, 1881.

Application filed September 13, 1880. (No model.)

*To all whom it may concern:*

Be it known that I, THOMAS J. HENABERY, of Chicago, in the county of Cook, in the State of Illinois, have invented certain new and useful Improvements in Drag-Sawing Machines, which are fully set forth in the following specification, reference being had to the accompanying drawings, in which—

Figure 1:
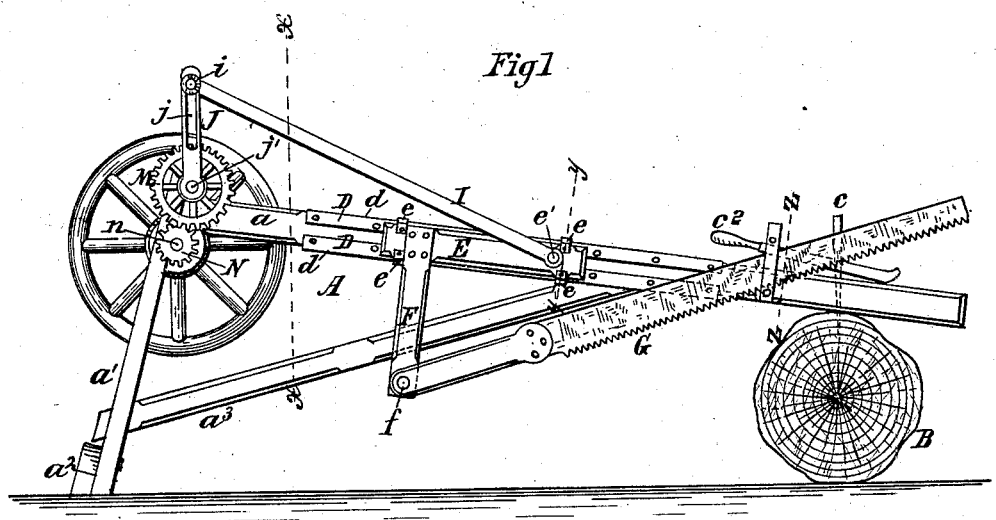
Figure 3:
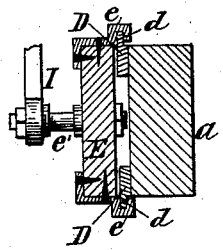
Figure 2:
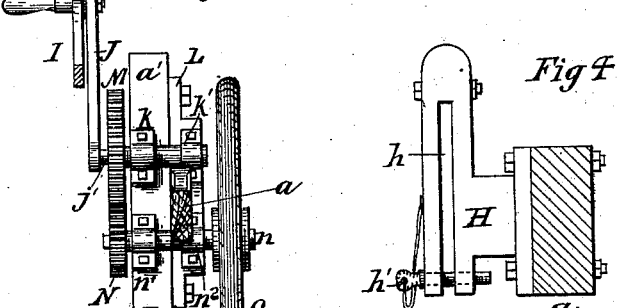
Figure 4:
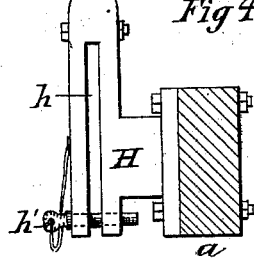
Figure 5:
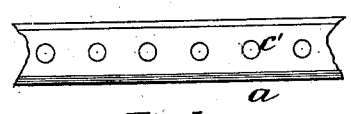
Figure 6:
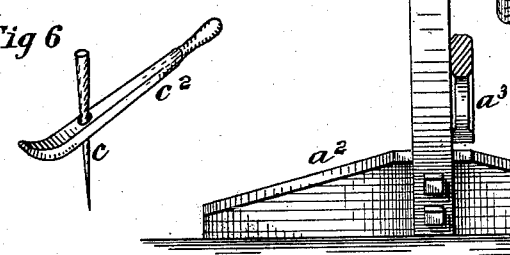

Figure 1 is a side elevation of a saw having my improvements. Fig. 2 is a vertical section on the line $x\ x$, Fig. 1. Fig. 3 is a section on the line $y\ y$ in Fig. 1. Fig. 4 is a section on the line $z\ z$ in Fig. 1. Fig. 5 is a plan view of a portion of the main beam, near the forward end. Fig. 6 is a detail view of the apparatus for fastening the main beam to the log.

The same letters denote the same parts in all the figures.

My invention relates to portable saws for cutting logs and other large pieces of wood; and the object of it is, by means of the devices and combinations of devices hereinafter set forth, to make such saws more convenient of operation, more uniform in motion, and more economical of force than those now in use.

In the drawings, A represents the main frame of my saw, consisting of the main beam $a$, secured, at the end farthest from the log, to a standard, $a'$, preferably inclining slightly toward the log, and itself secured to a base, $a^2$, and of a brace, $a^3$, connecting the main beam, near its farther end, with the lower end of the standard.

The main beam is to be supported, near its farther end, by the log B which is to be cut, to which it is fastened by the pin $c$ passing through one of several holes, $c'$, bored vertically through the beam, as shown in Fig. 5, and by the dotted lines in Fig. 1, and capable of being drawn out again by a lever, $c^2$, as shown in Figs. 1 and 6.

To one side of the main beam $a$ are affixed a pair of cleats or rails, D, parallel to the length of the beam. The treads $d$ of these rails project slightly above and below the beam respectively, so as to enter the grooves of the guides $e$ affixed to the slide E, near its ends. By means of these rails and guides the slide may have a backward and forward motion lengthwise of the beam, while it cannot be laterally or vertically displaced.

From the end of E nearest the standard $a'$ projects downward, in a direction nearly perpendicular to the length of the beam and not quite far enough to touch the ground, a rigidly-attached arm, F, to whose lower end, at $f$, is pivoted the handle end of the saw G, which may be of the ordinary straight form.

The other end of the saw is free, except that when the saw is not in use it is lifted up into the slot $h$ of the frame H, affixed to the same side of the beam as G, and is prevented from dropping out again by passing the pin $h'$ through a pair of corresponding holes in the lower parts of the opposite walls of the slot, and thus closing it.

At $e'$, near the forward end of the slide E, is pivoted a pitman, I, the other end of which is pivoted at $i$ to a crank, J, whose shaft $j'$ has its bearings in the boxes $k$ and $k'$, set respectively on the forward face of the standard $a'$ and on the block L, which is bolted to the farther side of $a'$. By turning the crank a reciprocating motion is communicated to the pitman I, and consequently to the slide E, which moves the saw back and forth, the weight of the saw itself holding it in its place on the log and adding force to the cut.

By means of the slot $j$ the pitman may be adjusted on the crank at different distances from the shaft, and the length of stroke thus varied.

On the crank-shaft $j'$, and on the same side of the standard $a'$ as the crank, is rigidly set a cog-wheel, M, so as to turn with the revolution of the shaft. The teeth of this wheel engage with those of the pinion N, rigidly set on the shaft $n$, which turns in the boxes $n'$ and $n^2$, affixed to the standard $a'$ and block L, below the boxes $k$ and $k'$ of the crank-shaft, and on the same faces of the standard and block. The shaft $n$ projects beyond the block L and beyond the outer side of the beam $a$, and bears on its outer end, rigidly affixed to it, a fly-wheel, O.

When the operator turns the crank the cog-wheel, which is set on the crank-shaft, turns the pinion on the shaft $n$, and thus communicates its motion to the fly-wheel, which, by its constant revolution, preserves the momentum acquired in each stroke of the saw, which would otherwise be lost by the reversal of the reciprocating motion at the end of the stroke.

What I claim as my invention, and desire to secure by Letters Patent, is—

1. In a sawing apparatus, the main beam $a$, provided with perforations $c'$, in combination with the pin $c$ and the lever $c^2$, substantially as and for the purpose described.

2. In a sawing-machine, the main beam $a$, slide E, having a reciprocating motion thereon, saw $g$, having one end pivotally connected with E and the other end free, and perforated frame H, set on the forward part of the main beam and provided with the slot $h$, open at the bottom, and with the pin $h'$, all in combination, substantially as and for the purpose described.

3. The main beam $a$, slide E, having a reciprocating motion thereon and provided with the downwardly-projecting arm F, saw G, pivotally connected at one end with F and having the other end free, crank J, provided with the slot $j$ and pitman I, pivoted at one end to the slide E and at the other adjustably in the slot $j$, all constructed, arranged, and operating in combination, substantially as and for the purpose described.

THOMAS J. HENABERY.

Witnesses:
JNO. C. MACGREGOR,
L. A. BUNTING.